United States Patent [11] 3,558,842

[72] Inventors Abram Lazarevich Livshits
Profsojuznaya ul. 62. korp, 2, kv. 69;
Mark Shmulevich Otto, Leningrad skoe
shosse, kvarta 11, Korp. 3. kv. 139,
Moscow, U.S.S.R.
[21] Appl. No. 621,031
[22] Filed Mar. 6, 1967
[45] Patented Jan. 26, 1971

[54] METHOD OF ELECTROEROSIVE MACHINING OF CURRENT-CONDUCTING MATERIALS AND A DEVICE FOR EFFECTING SAME
6 Claims, 14 Drawing Figs.
[52] U.S. Cl. .................................................... 219/69
[51] Int. Cl. .................................................... B23p 1/08
[50] Field of Search .......................................... 219/69C, 69G, 69P

[56] References Cited
UNITED STATES PATENTS
3,054,931 9/1962 Inoue ........................... 219/69(P)X
3,283,116 11/1966 Scarpelli ....................... 219/69(P)
3,213,258 10/1965 Ferguson ....................... 219/69(P)
3,267,327 8/1966 Webb ............................. 219/69(P)X Primary Examiner—R. F. Staubly
Attorney—Glascock, Downing & Seebold ABSTRACT: The electroerosive machining of current conducting materials which is effected by a series of impulses each having an amplitude-fluctuating intricate form which breaks through the erosion gap, evaporates, melts down and throws off metal from the molten pool, partially evacuates the products of erosion from the working gap and forms a protective film from the products of the working liquid cracking on the tool electrode. There may be employed an additional impulse having a current and a voltage amplitude two to 10 times greater for finally removing the erosion products.

METHOD OF ELECTROEROSIVE MACHINING OF CURRENT-CONDUCTING MATERIALS AND A DEVICE FOR EFFECTING SAME

The present invention relates to a method of electroerosive machining of current-conducting materials with the use of impulses of voltage and current, and to a device for effecting the same.

Known in the prior art are methods for electroerosive machining with the use of impulses of voltage and current which provide for the evaporation, melting down and throwing off of metal from the molten pool, and for a partial evacuation of the erosion products from the working gap (See, for example, the book, written by A. L. Lifschitz, entitled "Electroerosive machining of metals," Mashgiz, 1957).

Also known are generators of impulses of voltage and current having a high efficiency composed of a generator, providing for a break through of the erosion gap with the desired value of the gap, and a source of impulses of voltage and current evaporating, melting down and throwing off metal from the molten pool, as well as partially evacuating the products of erosion from the working gap, with the generator and source being interlocked.

Disadvantages of the known methods are the impossibility of considerably decreasing the wear of an electrode tool with a high productive capacity and finish of the surface to be machined, as well as an insufficient evacuation of the erosion products from the interelectrode gap, especially when machining deep shaped hollows.

An object of the present invention is to provide a method of and device for the electroerosive machining of current-conducting materials which effect the following operations in succession: the break through of the erosion interval with the required value of the working gap provided; the evaporation and melting down of the metal, its removal from the molten pool, and the partial evacuation of the erosion products from the working gap; the protection of the electrode tool from the erosion; and the periodic effective evacuation of the erosion products from the working gap, as well as, when it is required to vary the quality of the surface, the transfer of material from one electrode to another.

The essence of the invention consists in the fact that in the method of electroerosive machining of current-conducting materials at least three impulses of voltage and current of various characteristics are supplied to the erosion gap so as to be repeat periodically, the first of which is designed to break through the erosion gap, the second to evaporate, melt down and throw off the metal from the molten pool, and partially evacuate the erosion products from the working gap, while the third is to form the protective film on the surface of the electrode tool.

It is expedient to supply an additional impulse of voltage and current so as to cause the final evacuation of the erosion products from the working gap.

A continuous chain of alternating impulses of various amplitude may be adopted as an impulse of voltage and current, evaporating, melting down and throwing off the metal from the molten pool, and as an impulse to form the protective film on the surface of the electrode tool.

In the proposed device, in which the presettable generator simultaneously actuates an ignition generator and a power generator connected in parallel to the erosion gap, the power generator is designed as two switchover stages connected in parallel, and a presettable generator, according to the present invention, comprises at least three small-power generators of rectangular impulses of various duration and phase, each of which is connected to the ignition generator and at least to one of the switchover stages.

It is expedient to employ as small-power generators of rectangular impulses single-phase inactive multivibrators complete with shapers that are connected to a further generator for starting the multivibrators.

The connection of the multivibrator to the further generator may be effected by the aid of a switch. At least one multivibrator may be directly connected to the further generator, while the remaining inactive multivibrators may be connected one to another in series through a differentiating capacity.

A coincidence circuit may be connected between the small-power generator of rectangular impulses and the input of the switchover stage.

Other objects and advantages of the present invention will become more fully apparent from a consideration of the following description of exemplary embodiments thereof, taken in conjunction with the accompanying drawings, in which.

Figure 4:
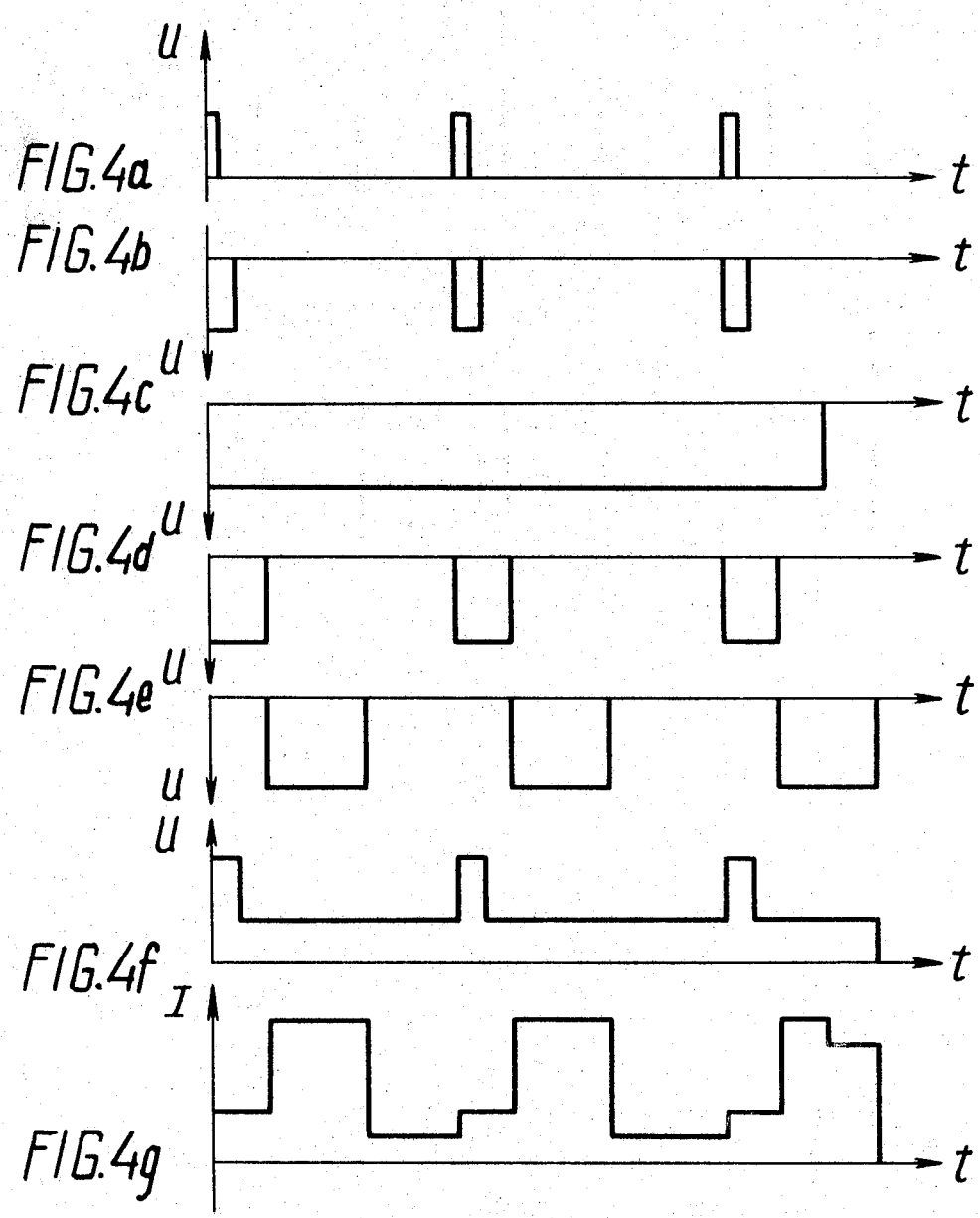
FIG. 4a represents impulses at the outlet of the further generator.
FIG. 4b represents impulses at the output of one of the inactive multivibrators.
Figure 5:
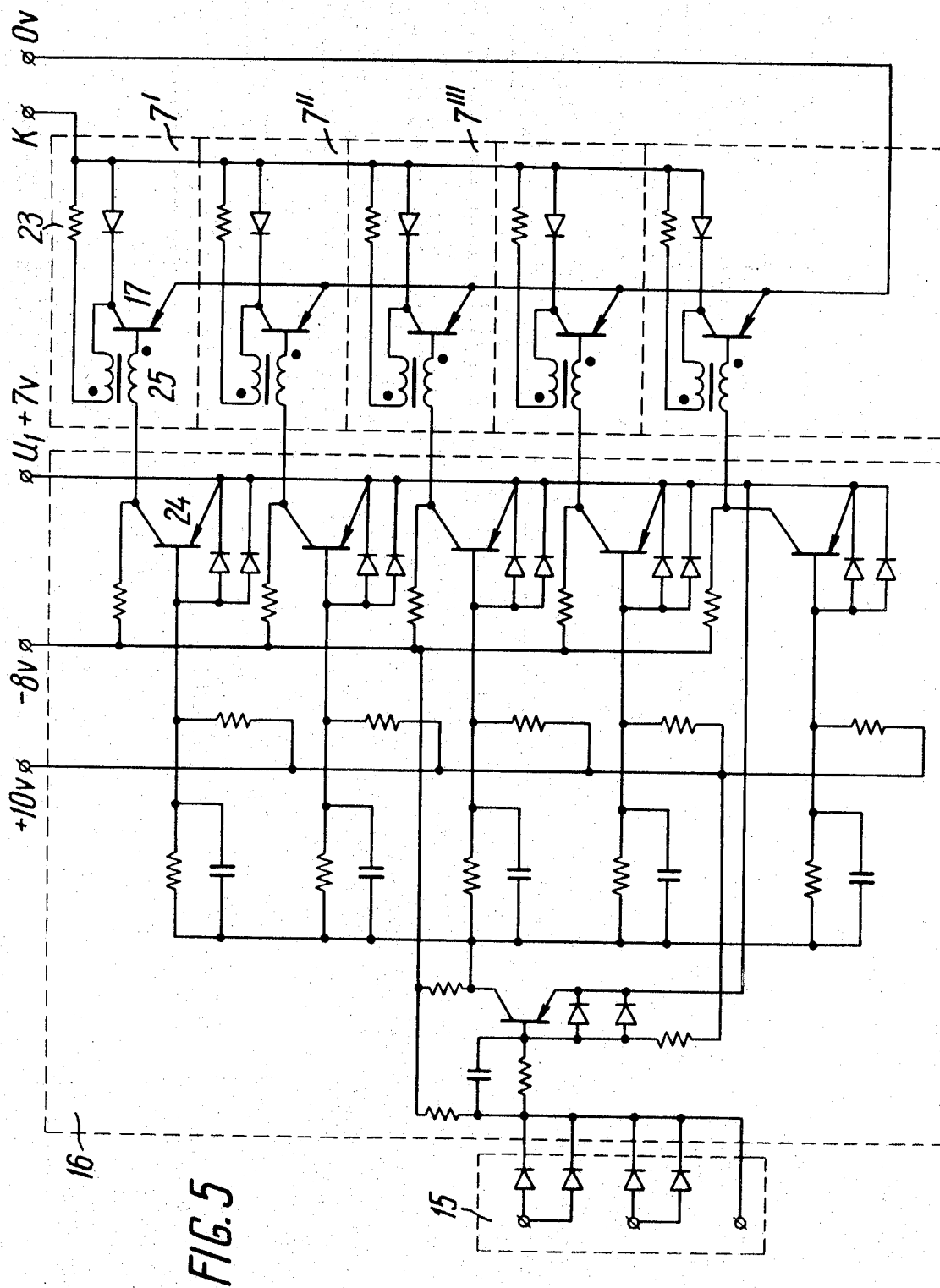
Figure 6A:
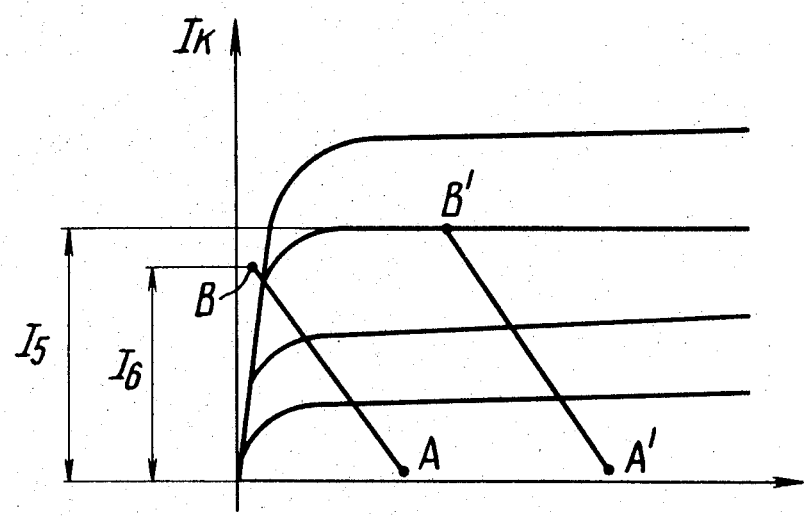
Figure 6B:
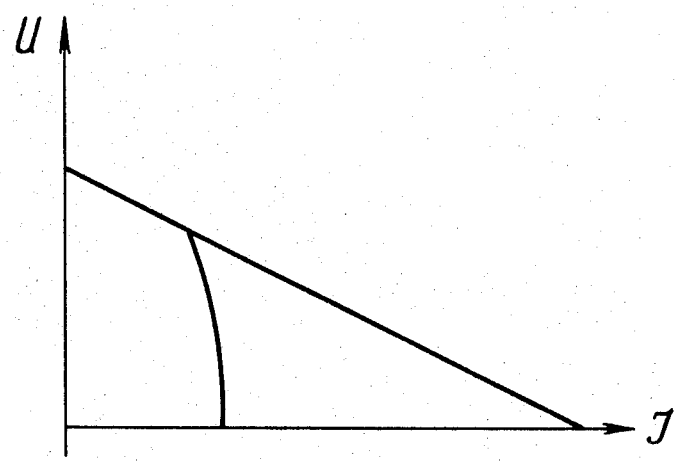

FIGS. 4c—e; represents impulses at the output of all of the other multivibrators;

FIG. 4f shows the voltage of idle run in the erosion interval;

FIG. 4g shows the current passing through the erosion interval;

FIG. 5 is a diagrammatic view of an electric network of the switchover stages, according to the present invention;

FIG. 6a is characteristic of the conditions of operation of the output transistors of the switchover stage; and FIG. 6b represents the external loading characteristic of the generator.

The electroerosive machining results from an action on a system consisting of an electrode tool and another electrode part, which are in a certain working medium, of periodic impulse voltages and currents, whose characteristics are determined by functions that are performed by the given impulse voltages and currents during the machining process.

For example, to initiate the discharge channel, the indicated system is actuated by a voltage impulse whose value is sufficient for breaking through the erosion gap with the gap required available. Such impulses of voltage will be referred to as "igniting impulses."

Further, the action of the periodic impulses of a high current brings about the local melting down, evaporation of portions of metal, throwing off of these portions from the molten pool, and the partial evacuation of the erosion products from the working gap. Such impulses of voltage and current will be referred to as "thermal impulses."

The system may be also influenced by periodic impulses of current providing for the formation of a protective film on the surface of the electrode tool, thereby protecting the latter from damage. Such impulses will be referred to as "protective impulses." The formation of the protective film is favored by a positive displacement of the discharge channel, forming after the breakthrough of the erosion gap, which is effected by current impulses having a form varying with time.

The system may be influenced by impulses of current and voltage resulting in the formation of powerful shock waves effecting the evacuation of the erosion products from the interelectrode gap. Such impulses of voltage and current are called "evacuating impulses."

The system may be also influenced by other types of impulses of voltage and current, intended, for example, for varying the quality of the surface, transfer of material, etc. Hence, in a general case, the system may be subjected to the action of impulses of voltage and current of $n$ types, each of which is characterized by a certain duration, amplitude and form of voltage, as well as by a period of sequence which is selected depending upon the purpose of the given impulse.

Figure 1:
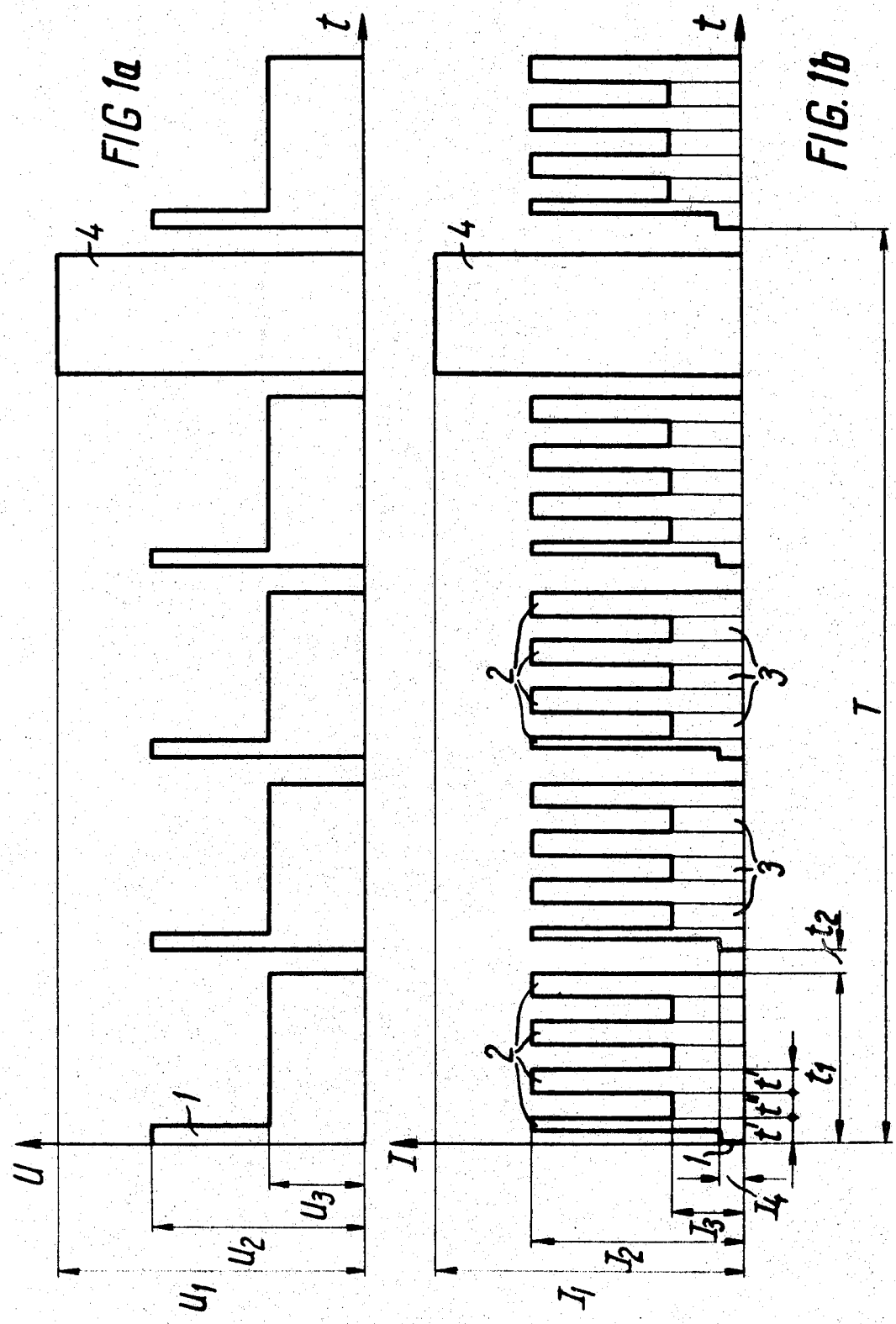
FIG. 1a represents the form of voltage impulses according to the present invention.
FIG. 1b represents the form of current impulses according to the invention.

In a particular case, with a view of ensuring the required value of the interelectrode gap, as well as melting down, evaporating, removing metal from the molten pool, the partial evacuating of the erosion products from the working gap, the formation of the protective film on the surface of the electrode tool, and periodic effective evacuation of the erosion products from the interelectrode gap, there are employed four types of impulses of voltage and current, namely: igniting 1 (FIGS. 1a, 1b), thermal 2, protective 3, and evacuating 4.

The first three types are united in one impulse having the form of voltage and current varying with time, the impulse having the igniting impulses 1 of voltage on the fore front and current in the form of continuous chains, consisting of thermal impulses 2 of relatively large amplitude following each other at intervals, in the course of which act the protective impulses 3 of a current of relatively small amplitude, displacing the discharge channel. These impulses of current follow each other in packs (or series), and in the interval therebetween takes place the evacuating impulses 4 of voltage and current.

The ratios of the characteristics of impulses are thereby adopted to be as follows:

$$\frac{t_1}{t'+t''} = (2 \div 40);$$
$$t'' = (0.3 \div 20)t';$$
$$t_2 \geq t''$$
$$T = 2 \div 1,000(t_1 + t_2)$$
$$u_1 = (1 \div 100)u_3$$
$$u_2 = (1.5 \div 15)u_3$$
$$I_1 = (5 \div 50)I_2$$
$$I_2 = (2 \div 20)I_3$$
$$I_3 = (1 \div 100)I_4,$$

in which $t_1$ is the time of action of an impulse having the form of voltage and current varying with time;

$t_2$ is the time of interval;

$t'$ is the time of duration of a thermal impulse 2 with current $J_2$;

$t''$ is the time of duration of a protective impulse 3 with current $J_3$;

T is the period of sequence of the chain of impulses;

$J_1$ is the current of evacuating impulses 4;

$J_4$ is the current of igniting impulses 1;

$J_2$ is the current of thermal impulses 2;

$J_3$ is the current of protective impulses 3;

$u_1$ is the voltage of evacuating impulses 4;

$u_2$ is the voltage of igniting impulses 1;

$u_3$ is the voltage of thermal 2 and protective 3 impulses.

Figure 2:
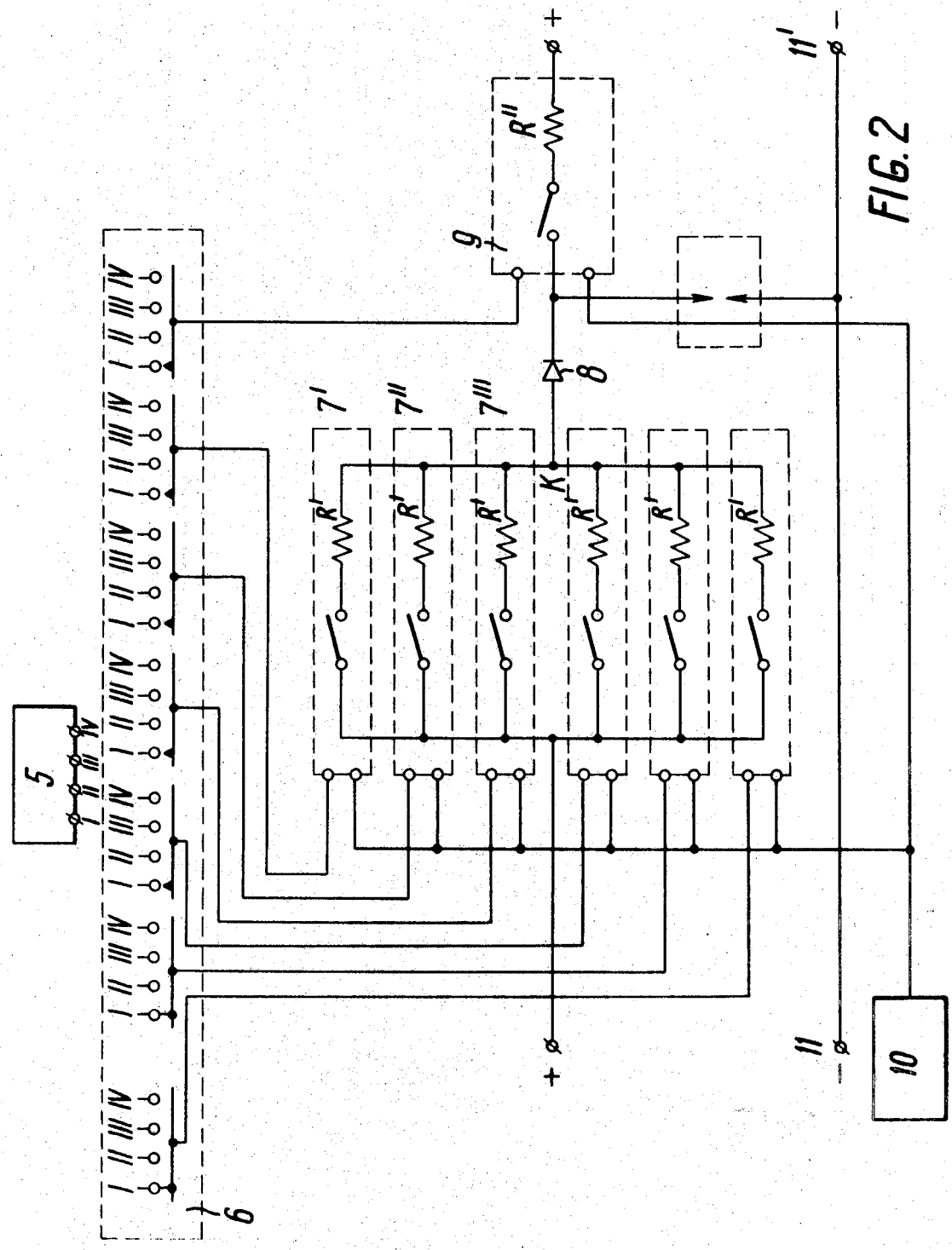
FIG. 2 is a diagrammatic view of the present device.

A device for effecting the method of electroerosive machining with the use of impulses of voltage and current comprises a presettable generator 5 (FIG. 2), a block of packet switches, a group of identical switchover stages 7', 7'', 7''', a dividing diode 8, a generator 9 for igniting impulses, and a block 10 for eliminating short circuits in the erosion gap. The switchover stages 7 and generator 9 are supplied by sources 11 and 11' of constant voltages.

Figure 3:
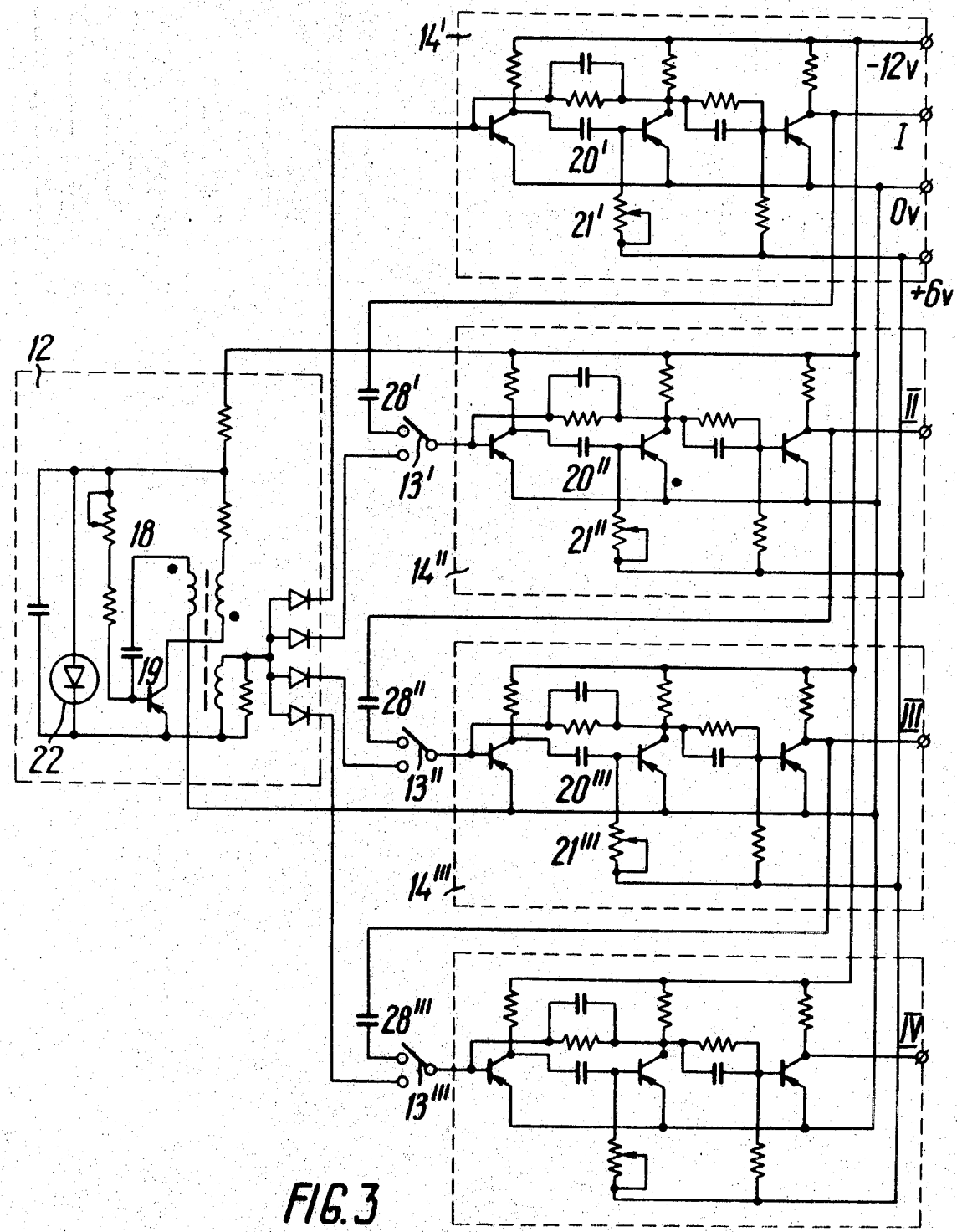
FIG. 3 is a diagrammatic view of an electric network of the presettable generator, realized according to the present invention.

The presettable generator 5 illustrated in FIG. 3 comprises a further generator 12 to the outputs of which there are connected, via switches 13', 13'', 13''', the inputs of small-power generators of rectangular impulses in the capacity of which are employed inactive multivibrators complete with shapers 14', 14'', 14'''.

The group of switchover stages shown in FIG. 5, is provided at its input with a diode circuit 15 of coincidence, to which is connected preliminary amplifiers 16 of power connected according to a circuit of direct connection with output power transistors 17.

The generator 9 is also provided on the input with a diode coincidence circuit, preliminary amplifiers and switchover stages connected in series (not shown in the drawing).

The device operates as follows.

The generator 12 produces the impulses for starting the multivibrators 14. The frequency of sequence of the starting impulses is gradually adjusted by varying a resistance 18 in the chain of discharge of a timing capacity 19. The duration of impulses of multivibrators 14 is determined by the values of timing capacities 20', 20'', 20''', and resistances 21', 21'', 21'''.

The voltage of supply of the generator 12 is stabilized by means of a voltage stabilizing tube 22. Upon passing the shapers, the rectangular impulses are directed through a block of packet switches 6 to the inputs of the preliminary amplifiers 16 of the power of switchover stages 7', 7'', 7'''.

The signals from the presettable generator 5, however, commutate the switchover stages 7 only in a case in which there is no short-circuiting of the erosion gap. With the short-circuiting of the erosion gap of a duration exceeding 0.01 sec., the block 10 for eliminating the short circuits, independently of the signals received from the generator 5, via the diode circuits 15 deactivates all the switchover stages 7 and the ignition generator 9. The generation of impulses in the erosion gap is resumed after the elimination of a contact short circuit.

In a case of the operation according to the duty of the erosion loading, for example, with an impulse discharge, current-limiting resistances 23 (FIG. 5) and an equivalent resistance of the erosion gap are employed as a load of the power transistors 17. The transistors operate thereby according to the duty "shutoff-saturation" (FIG. 6a, straight line AB). In a case of a short circuit of the erosion gap, due to a corresponding selection of characteristics of input chains, the power transistors 17 operate according to the duty "shutoff active region" (FIG. 6a, the straight line AB) so as to eliminate short circuits until the actuation of the block 10, due to which current $J_5$ of the short circuit exceeds but slightly current $J_6$ when operating according to the duty of erosion loading.

This defines the form of the external charging characteristic of a device shown in FIG. 6b.

The reliable operation of the power transistors 17 (FIG. 5) with high frequencies is possible with a fairly short time of switching over the power transistors 17. In a contrary case, their overheating and failure is inevitable.

The time of transition of the transistor from the shutoff duty into the saturation duty, i.e. the time of its activation into a circuit with a common emitter is inversely proportional to the value of the impulse of an opening current in the base and directly proportional to the duration of the front current of the base.

The time of transition of the transistor from the saturation duty into the shutoff duty, i.e. the time of its deactivation, is a determining factor, and is mainly defined by the time of dissipation of nonbasic carriers from the base region. For the decreasing thereof, there is required a voltage impulse which is positive relative to the emitter for a transistor with the PNP junction, having a steep front and supplied to the base through a small resistance.

For this reason, the commutation of the power transistors 17 is effected by means of high frequency transistors 24 of the preliminary amplifiers of power 16, operating according to the commutation duty, and saturating impulse transformers 25 for producing the positive feedback in the course of the commutations.

For example, the transition of the transistor 24 into the shutoff duty produces an impulse of current with a steep front in the circuit of the base of the transistor 17, thereby throwing over the latter into the operation according to the saturation duty. As it is evident from the drawings, the potential of the emitter of the transistor 24 is positive relative to the emitter of the transistor 17. Therefore, the transition of the transistor 24 into the operation according to saturation duty is likely to set up a voltage drop which is positive relative to the emitter of the transistor 17 supplied to the base of the latter through a small (in the order of 1 ohm) resistance of the type "emitter-collector" of the open transistor 24. The current of the transistor 17 operating according to the shutoff duty is approximately equal to the reverse current of its collector.

The application of the positive feedback produces, during the commutation, additional impulses on the basis of the transistor 17, which decrease its switchover time to a still larger extent.

As it is evident from the presettable generator illustrated in FIG. 3, the inactive multivibrators 14', 14'', 14''', with the positioning of switches 13', 13'', 13''' indicated in the drawing, are connected via differentiating capacities 28', 28'', 28''', and are started in a successive order one after another by the aid of the impulses of the generator 12. With the position of the switches 13', 13'', 13''' varying, the multivibrators 14 may be connected in such a manner that a number thereof is started according to the parallel connection, while another number is started according to the series connection. The switchover stages 7 may be connected through the block 6 of the packet switches in any combination to the outputs of the presettable generator 5.

Such a plotting of the diagram allows any form of the current impulse varying with time and passing through the erosion gap to be obtained.

The form of the voltage of the idle run and the form of current passing through the erosion gap shown in FIGS. 4g, 4f, may be obtained, for example, when starting three multivibrators with outputs I, II and III from the further generator FIGS. 5 and 4a), while the fourth multivibrator may be started from the output of the third (FIGS. 4b—4c) when connecting the generator 9 to the output 1 (FIG. 4b), the switchover stage 7' to the output II (FIG. 4c), the switchover stage 7'' to the output III (FIG. 4d), and the remaining stages to the output IV (FIG. 4e).

Any other desirable form of current may be preset by varying the duration of the impulses of inactive multivibrators 14, the frequency of the sequence of impulses of the generator 12, and the positioning of the switches 13', 13'', 13'''.

The application of the present method and device allows the labor productivity to be increased and decreased drastically the wear of the electrode tools employed both in roughing and finishing operations of the electroerosive machining, thereby enabling the machining of many parts to be effected with one electrode tool, which reduces the cost price of parts being machined.

Although the present invention is described in connection with its preferred embodiment, it is evident that there may be allowed modifications and variants that do not depart from the concept and scope of the invention, which will be readily understood by those skilled in the art.

All these modifications and variants are considered not to depart from the concept and scope of the invention, as defined by the appended claims.

We claim:

1. A device for effecting the electroerosive machining of current-conducting materials, comprising a presettable generator, defined by at least three small-power generators of rectangular impulses of voltage and current of various duration and phase; an ignition generator connected in parallel to the erosion gap and to one of said small-power generators of rectangular impulses for the starting thereof; a power generator connected in parallel to the erosion gap and comprising at least two switchover stages connected in parallel and at least one of which is connected to said small-power generators of rectangular impulses.

2. The device according to claim 1, wherein a switch connects said switchover stages to said small-power generators of rectangular impulses having various duration and phase.

3. The device according to claim 2, wherein at least three single-phase inactive multivibrators, which for starting purposes, are connected via a switch either in parallel to a further generator or in series one after another, constitute said small-power generators.

4. The device according to claim 3, wherein a circuit is connected between said small-power generators of rectangular impulses and the input of said switchover stage.

5. A method of electroerosive machining of current-conducting materials comprising supplying an electrode tool and an electrode workpiece with a series of impulses each having a voltage peak in the forefront and current in the form of a continuous chain of alternating parts having different current amplitudes in which the parts having a larger amplitude are equal to one another and the parts having a smaller amplitude are equal to one another in magnitude or current amplitude, and upon terminating the impulse or during interpulse intervals the current and the voltage values equal zero.

6. The method of electroerosive machining of current-conducting materials as claimed in claim 5 further comprising supplying an additional impulse having a current and a voltage amplitude 2 to 10 times greater for finally removing the erosion products.